(12) United States Patent
Li

(10) Patent No.: US 7,386,805 B2
(45) Date of Patent: Jun. 10, 2008

(54) USER INTERFACE FOR PHASED DATA ENTRY

(75) Inventor: Jin Li, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/228,246

(22) Filed: Aug. 26, 2002

(65) Prior Publication Data

US 2003/0043187 A1    Mar. 6, 2003

(30) Foreign Application Priority Data

Aug. 29, 2001    (CA)    ................................ 2356017

(51) Int. Cl.
*G06F 3/00*    (2006.01)

(52) U.S. Cl. ...................... 715/781; 715/764; 715/806; 715/803

(58) Field of Classification Search ................ 715/700, 715/764, 781, 803, 806, 817–820, 829; 707/202–204; 711/161–162; 719/313, 316, 317, 328
See application file for complete search history.

(56) References Cited

U.S. PATENT DOCUMENTS

| | | | | |
|---|---|---|---|---|
| 4,558,413 A * | 12/1985 | Schmidt et al. | ............. | 707/203 |
| 5,276,860 A * | 1/1994 | Fortier et al. | ................... | 714/6 |
| 5,754,858 A | 5/1998 | Broman et al. | ............. | 395/701 |
| 5,786,816 A * | 7/1998 | Macrae et al. | ............... | 715/837 |
| 5,799,193 A | 8/1998 | Sherman et al. | ............. | 395/703 |
| 5,826,086 A | 10/1998 | Arima et al. | ................ | 395/701 |
| 5,933,634 A | 8/1999 | Enokido et al. | ............. | 395/701 |
| 6,058,264 A | 5/2000 | Glaser | ......................... | 395/702 |
| 6,104,393 A | 8/2000 | Santos-Gomez | ............ | 345/336 |
| 6,167,564 A | 12/2000 | Fontana et al. | ................. | 717/1 |
| 6,170,081 B1 | 1/2001 | Fontana et al. | ................. | 717/1 |
| 6,173,291 B1 * | 1/2001 | Jenevein | ..................... | 707/200 |
| 6,195,791 B1 | 2/2001 | Carlson et al. | ................. | 717/1 |
| 6,199,198 B1 | 3/2001 | Graham | .......................... | 717/4 |
| 6,205,575 B1 | 3/2001 | Sherman et al. | ............... | 717/1 |
| 6,630,946 B2 * | 10/2003 | Elliott et al. | ................. | 715/781 |
| 6,684,229 B1 * | 1/2004 | Luong et al. | ............... | 707/204 |
| 6,757,698 B2 * | 6/2004 | McBride et al. | ............ | 707/204 |
| 6,934,722 B1 * | 8/2005 | Goshey et al. | ............. | 707/204 |
| 6,950,980 B1 * | 9/2005 | Malcolm | ..................... | 715/505 |
| 2001/0032209 A1 * | 10/2001 | Duxbury | | |
| 2003/0023965 A1 * | 1/2003 | Robilliard | .................... | 717/174 |

OTHER PUBLICATIONS

IBM Technical Disclosure, "Suspending and Resuming the Execution of an Expert System", Dec. 1, 1985, IBM, ip.com No. IPCOM000065529D, pp. 3187-3188.*

* cited by examiner

*Primary Examiner*—X. L. Bautista
(74) *Attorney, Agent, or Firm*—Andre Gibbs; Winstead PC

(57) ABSTRACT

A wizard user interface capable of being cancelled and later resumed without loss of data is disclosed. Canceling from the wizard prior to its completion will optionally cause data entered on any of the wizard's pages to be saved to a file and stored in non-volatile memory. Subsequent invocation of the same wizard user interface will optionally cause the data to be read from the file and repopulated into the wizard's pages to restore the cancelled wizard to its pre-cancellation state. The user interface accordingly permits data entry to be performed in phases, with the wizard being exited between phases.

15 Claims, 8 Drawing Sheets

USER INTERFACE FOR PHASED DATA ENTRY

FIELD OF THE INVENTION

The present invention relates to the field of software user interfaces, and more particularly to wizard software user interfaces.

BACKGROUND OF THE INVENTION

Contemporary computer systems employ various user interface (UI) mechanisms to facilitate data entry. One commonly utilised UI mechanism is the wizard. Wizards are typically employed when a data entry task lends itself to being broken down into a series of steps in order to improve the comprehensibility of the data entry task (e.g. when data to be entered by a user is deemed too confusing for entry by way of a single screen).

A wizard is a series of dialog boxes or "pages" that is presented in a particular sequence. Each page of the wizard corresponds to a step in the overall data entry task. The pages are often graphical but are not necessarily so. Typically, each page contains data entry fields of various types (e.g. radio buttons, text entry fields, checkboxes, etc.) and textual instructions describing the actions that should be taken by the user to enter data on the current page. A set of navigational controls is displayed in conjunction with each page to permit the user to traverse the wizard page-by-page. These navigational controls typically comprise four buttons: a "next" button for advancing to the next page of the wizard, a "back" button for going back to a previous page, a "finish" button and a "cancel" button (to be described).

In standard operation, upon the occurrence of a triggering event the wizard will be invoked and the first page of the wizard will be displayed. The user interacts with the wizard, by way of a mouse and keyboard for example, to enter any data requested on the first page and, when finished, selects the "next" button to advance to the second page. This process is repeated until all of the wizard's pages have been traversed. If necessary, the user may select the "back" button to review previously entered data or to correct a previous entry.

When all of the wizard's pages have been traversed and all of the required data entered, the "finish" button will become active. Upon its selection by the user, the wizard is exited and the data entered by the user is processed in accordance with the wizard's underlying "business objective" (i.e. its purpose).

Alternatively, at any stage the user may select the "cancel" button. Selection of this button causes the wizard to be terminated and any data entered in any of the wizard's pages to be lost. Disadvantageously, subsequent re-invocation of the wizard requires any data that was previously entered on any of the wizard's pages to be re-entered. As a result of this cancellation behaviour, known wizard UIs are ill-suited for phased data entry (i.e. for data entry in multiple sessions with the wizard being exited between sessions), because they are incapable of being cancelled and later resumed with previously entered data intact.

When a wizard UI is developed in an object oriented programming language such as C++ or Java™, the developer will typically utilise a standard object oriented UI class library, such as the Microsoft® Foundation Class library, the Java™ Foundation Class Swing components from SUN® Microsystems (typically referred to simply as "Swing"), or the Standard Widget Toolkit from IBM®, to facilitate wizard development. In particular, the developer will utilise various wizard-related classes from the selected class library to implement the wizard UI. These classes are usually subclassed (i.e. have classes derived therefrom) and the subclasses adapted to implement the desired wizard content according to the requirements of the application.

Wizard-related classes in standard UI class libraries normally follow a "framework-page paradigm" which defines the classes for implementing a wizard UI, as well as the interrelationships between these classes and the general functionality of each class. Two classes are central to the framework-page paradigm: the wizard framework class and the wizard page class (it is noted that these classes may have different names in class libraries).

The wizard framework class defines the baseline functionality of the wizard mechanism and generally governs wizard features that are not content-related. The wizard framework class includes fields (i.e. class variables, which are referenced herein using the lowercase word "field", as opposed to data entry form fields, which are referenced herein using the capitalized word "Field") and methods for displaying the wizard's navigational controls, handling navigational control events, and managing the wizard's multiple pages for example. This class is instantiated once per wizard.

The wizard page class, on the other hand, is associated with the pages that provide the wizard with its content. This class is intended to be subclassed for each of the wizard's pages, with each subclass being adapted to implement the associated page. That is, the wizard page class acts as a base class from which multiple page classes—one per wizard page—are derived; each of the derived page classes is then completed by a developer, through the addition of fields and methods for example, to effect the desired content and layout for that page. The added fields and methods are referred to as the "business logic" of the wizard, as it is here at the page level where most of the wizard's substantive processing (which effects the wizard's business objective) is performed.

At run time, page objects (i.e. adapted page class instantiations) are dynamically accessible by the wizard framework object (i.e. the instantiation of the adapted wizard framework class). This accessibility permits the wizard framework object to invoke page object methods as necessary to trigger various page operations (e.g. the display of a particular page) in response to events detected at the framework level (e.g. a navigational control button event).

The loss of data upon a user's premature cancellation from a wizard UI (described above) is characteristic of known wizard UIs implemented in an object oriented programming language using a standard UI class library following the framework-page paradigm. Data loss in this case is typically a consequence of the developer's failure to override the wizard framework object's default behaviour (i.e. to simply exit the wizard) upon the detection of a "cancel" button event. Even when this default behaviour is overridden, the developer usually only adds code to invoke various cleanup operations (e.g. memory de-allocation). As a result, the data loss problem is not alleviated by known techniques of developing wizard UIs using standard UI class libraries.

What is therefore needed is a wizard UI which permits the wizard to be cancelled and later resumed without loss of data. What is also needed is a system for displaying such a wizard UI. What is further needed is a method of developing such a wizard UI in an object oriented programming language using a standard UI class library following the framework-page paradigm.

SUMMARY OF THE INVENTION

A wizard user interface capable of being cancelled and later resumed without loss of data is disclosed. Canceling from the wizard prior to its completion will optionally cause data entered on any of the wizard's pages to be saved. Subsequent invocation of the same wizard user interface will optionally cause the saved data to be repopulated into the wizard's pages to restore the cancelled wizard to its pre-cancellation state. The user interface accordingly permits data entry to be performed in phases, with the wizard being exited between phases.

In accordance with an aspect of the present invention there is provided a method for permitting phased data entry with a wizard user interface, comprising saving a state of the wizard user interface upon wizard cancellation.

In accordance with another aspect of the present invention there is provided a method of developing a wizard user interface capable of phased data entry, comprising adapting a wizard framework class and at least one wizard page class to save a state of the wizard user interface upon wizard cancellation.

In accordance with still another aspect of the present invention there is provided a wizard user interface capable of phased data entry, comprising means for saving a state of the wizard user interface upon wizard cancellation.

In accordance with another aspect of the present invention there is provided a computer readable medium storing computer software that, when loaded into a computing device, adapts said device to permit phased data entry with a wizard user interface by saving a state of the wizard user interface upon wizard cancellation.

In accordance with still another aspect of the present invention there is provided a computing device operable to permit phased data entry with a wizard user interface by saving a state of the wizard user interface upon wizard cancellation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
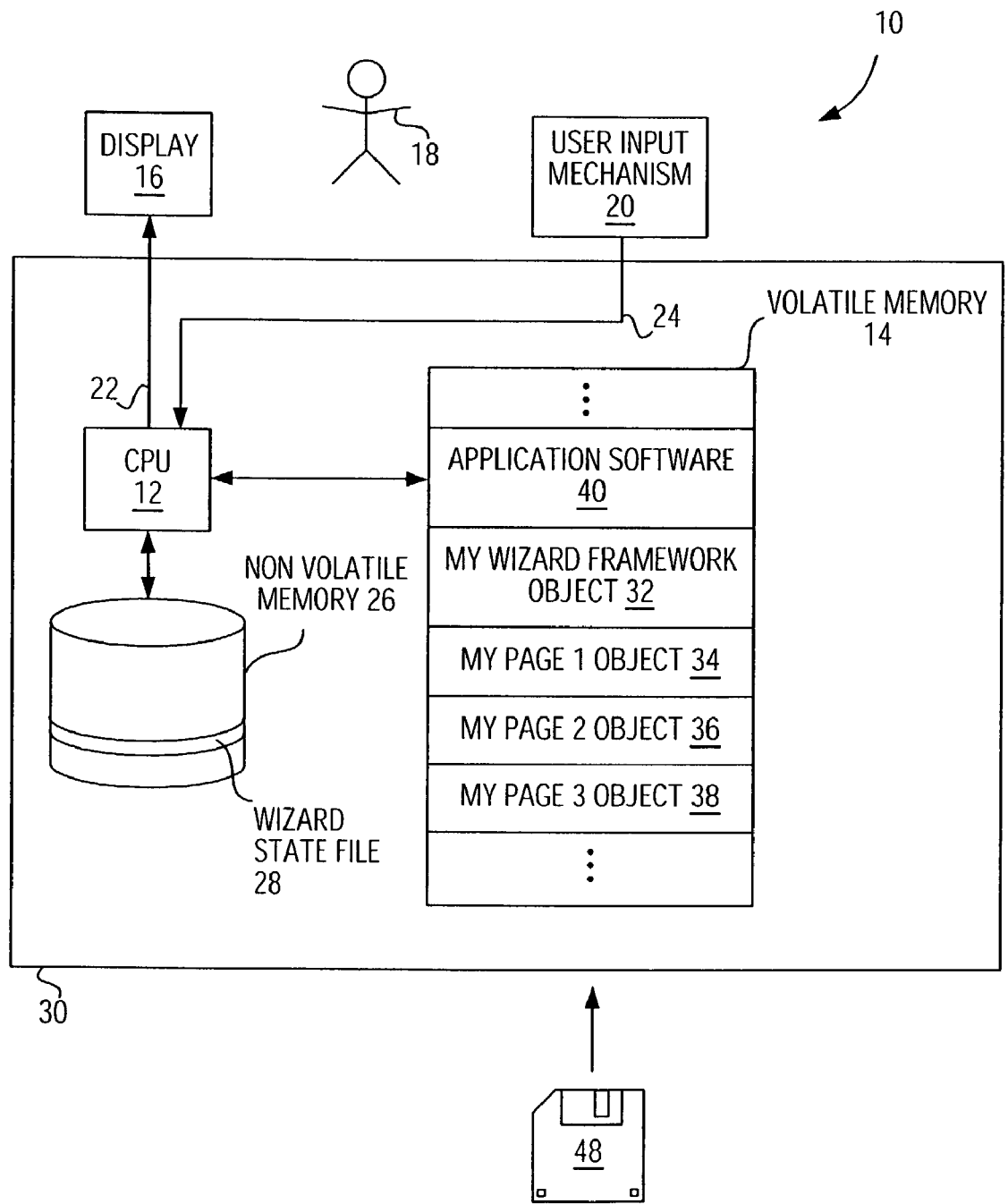
FIG. 1 is a schematic diagram of a computing system capable of displaying a wizard user interface (UI) exemplary of the present invention.

FIG. 1 illustrates an exemplary computing system 10 comprising a computing device 30 executing application software 40 stored in volatile memory 14 (e.g. RAM). The computing device 30, which may be a PC, server or hand-held device for example, includes a CPU 12 in communication with the volatile memory 14 as well as non-volatile memory 26 (e.g. a hard drive). The interconnections between the volatile and non-volatile memories 14 and 26 and the CPU 12 are conventional. A display 16 for displaying a graphical user interface (GUI) to a user 18 and a user input mechanism (UIM) 20 for receiving input from the user 18 are interconnected with the CPU 12 by way of links 22 and 24 respectively. The link 22 may not be a direct connection, and may for example include a video card (not shown) in communication with both the CPU 12 (by way of a system bus) and a monitor (by way of a cable) in a conventional manner. The interconnection of the UIM 20 with the CPU 12 is also conventional and may not be direct.

Display 16 is a conventional display device, such as a CRT, flat-screen monitor or liquid crystal display, capable of presenting a GUI to a user 18. The display 16 may form part of the computing device 30 comprising the computing system 10.

The user input mechanism 20 is a device or devices capable of generating user input representative of commands for operating the application software 40. The UIM 20 may be a keyboard, mouse or touch screen, for example, or a combination of these devices, and may be capable of controlling a movable pointer on the display 16 for interacting with a GUI. The UIM 20 may form part of the computing device 30 which comprises the computing system 10.

The application software 40 is an application which includes executable code for displaying a wizard user interface ("wizard UI" or simply "wizard") with a cancel/resume capability, as will be described herein. In the present embodiment, the application comprises a word processing application. However, in alternative embodiments, the application may be any other type of application that is capable of displaying a wizard with a cancel/resume capability, such as a spreadsheet or a software development tool for example.

The application software 40 (including the portion that implements the wizard UI) is developed using an object oriented language, such a C++ or Java™, and incorporates code from a standard UI class library, such as the Microsoft® Foundation Class library, the Java™ Foundation Class Swing components from SUN® Microsystems ("Swing"), or the Standard Widget Toolkit from IBM® for example. More specifically, two wizard-related classes defined in the included UI class library, namely a wizard framework class and a wizard page class, are utilised by the wizard UI portion of application software 40 to implement the wizard UI. These two classes provide certain baseline wizard functionality according to a known wizard framework-page paradigm that is characteristic of standard object oriented UI class libraries. As will be described, these two classes (referred to respectively as the "baseline wizard framework class" and "baseline wizard page class", and cumulatively as the "baseline wizard classes") are subclassed (i.e. have subclasses derived therefrom) and the subclasses are adapted to implement the cancel/resume capabilities of the wizard UI of the present embodiment. The application software 40 may be loaded into the volatile memory 14 of the system 10 from any suitable computer readable medium, such as a removable optical or magnetic disk 48, or from resident non-volatile memory 26 such as a hard drive or a read only memory chip.

In addition to containing the application software 40, the volatile memory 14 of FIG. 1 contains a "my wizard framework" object 32 and three wizard page objects, namely a "my page 1" object 34, "my page 2" object 36 and "my page 3" object 38. These four objects 32, 34, 36 and 38 comprise instantiations of the adapted subclasses referred to above and cumulatively implement the cancel/resume-capable wizard UI of the present embodiment. It is noted that the prefix "my" in the object names denotes the fact that the objects are not instantiations of baseline wizard classes, but rather are instantiated from classes that are derived from a baseline wizard class. It will be appreciated that the objects 32, 34, 36 and 38 only exist in volatile memory 14 at run time.

The non volatile memory 26 of FIG. 1 contains a saved wizard state file 28. The wizard state file 28 is generated and stored in non-volatile memory 26 upon the cancellation of the wizard UI by a user 18. The file 28 contains state information about the cancelled wizard UI including any data that may have been entered by the user 18 on any of the wizard's pages and, optionally, the most recently displayed wizard page. The presence of the wizard state file 28 in non volatile memory 26 indicates that a wizard UI has been cancelled and not yet resumed.

In the present embodiment, the wizard state file 28 comprises an eXtensible Markup Language (XML) data instance file which uses a predefined XML schema designed for wizard page data storage applications. The utilised XML schema defines various tags which serve as labels to be applied to wizard state data that is generated when a wizard UI is cancelled. As will be described, these tags are stored in the wizard state file 28 along with the generated state data, and serve to facilitate later identification and retrieval of page-specific data from the file 28 during restoration of a previously cancelled wizard.

Figure 2A:
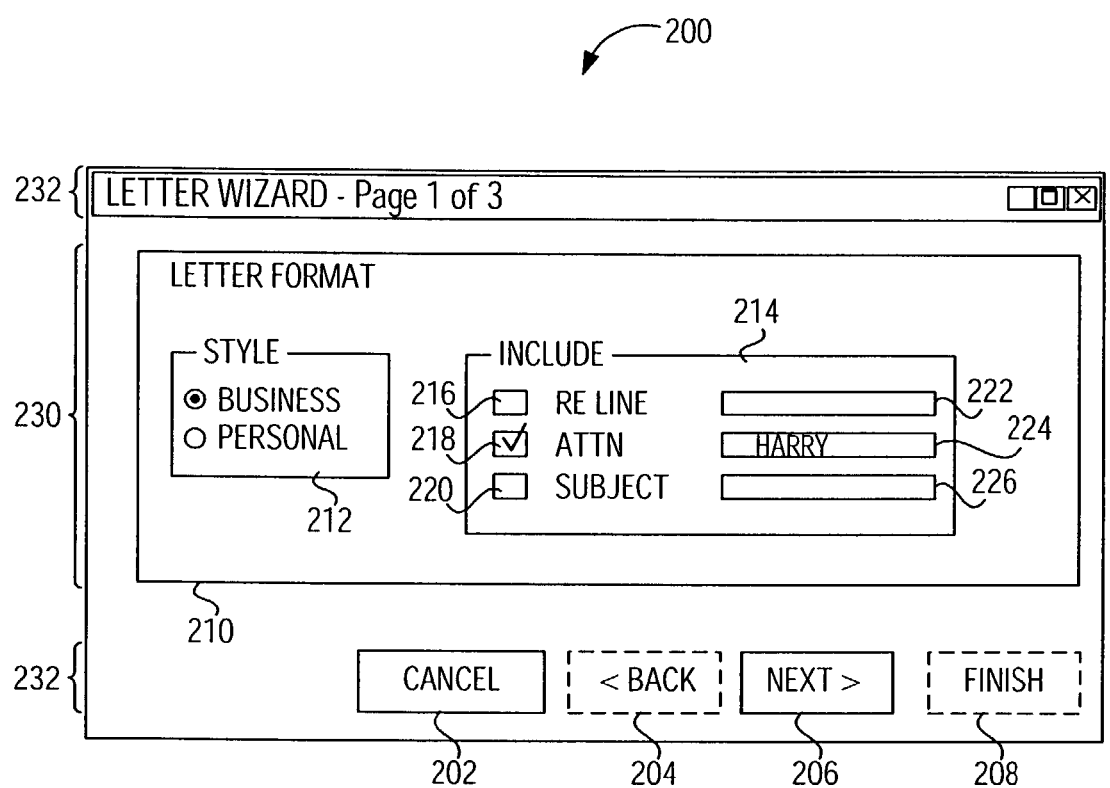
FIG. 2A illustrates a wizard UI generated by the computing system of FIG. 1 displaying a first page of its three pages.
Figure 2B:
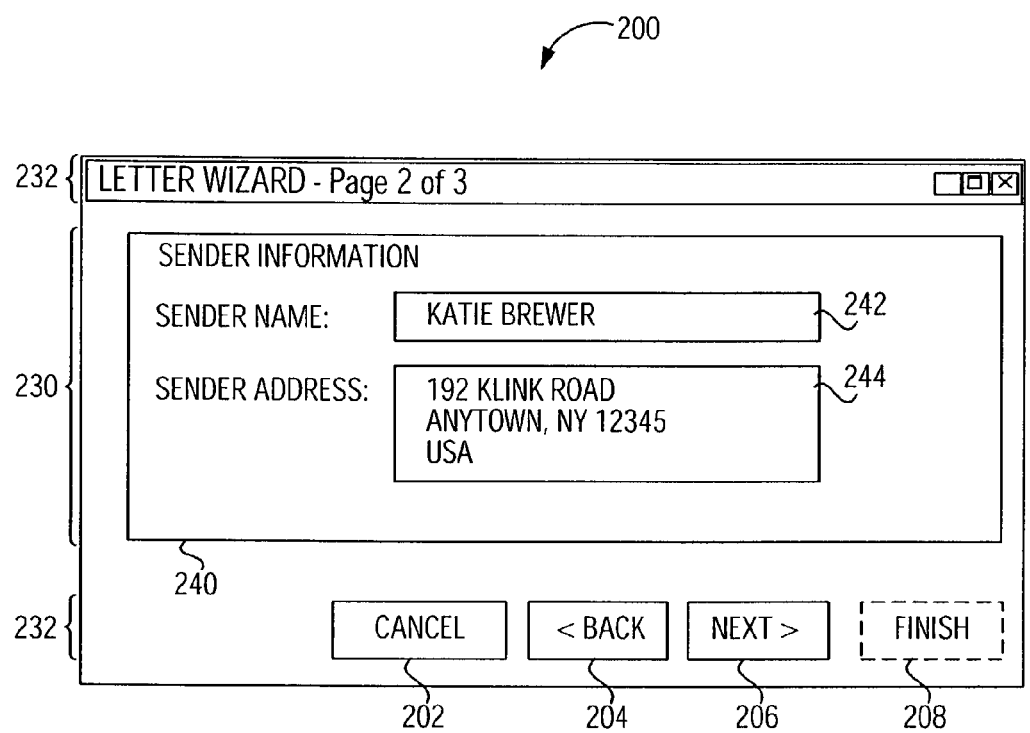
FIG. 2B illustrates the wizard UI of FIG. 2A displaying a second page of its three pages.
Figure 2C:
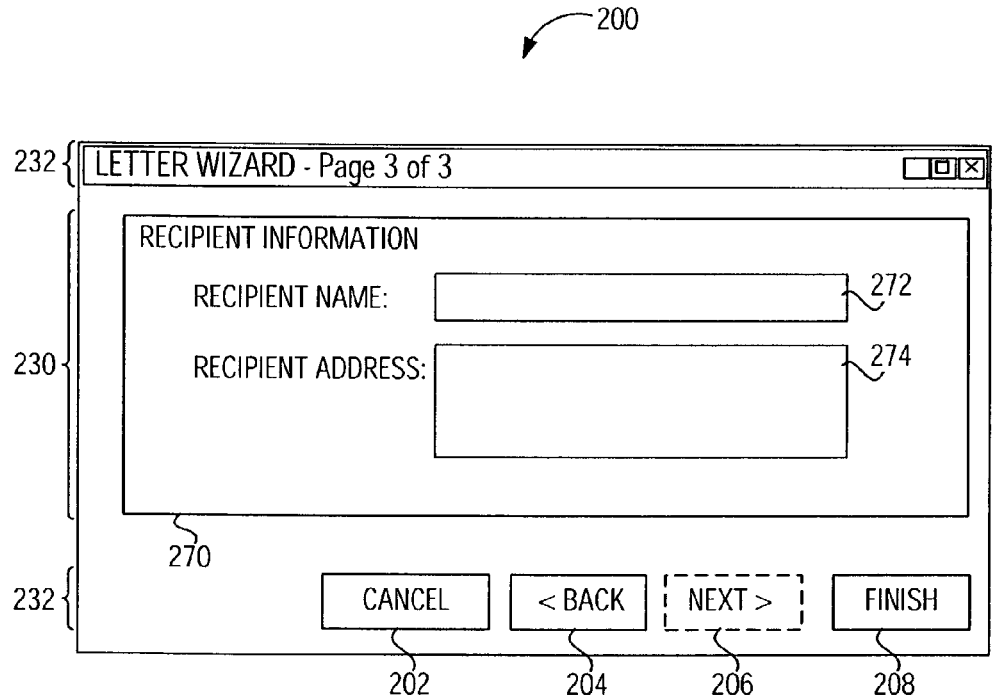
FIG. 2C illustrates the wizard UI of FIG. 2A displaying its third and final page.

Referencing FIGS. 2A, 2B and 2C, a wizard UI 200 generated by the computing system 10 is illustrated. The wizard UI 200 has three pages 210, 240 and 270, which are illustrated in FIGS. 2A, 2B and 2C respectively. The purpose of the wizard UI 200 in the present embodiment is to assist the user 18 in composing a letter that is being prepared using word processing application software 40.

As may be seen in FIG. 2A, the wizard UI 200 is comprised of two sections: a current page section 230 and a wizard frame section 232. The current page section 230 comprises the wizard's currently displayed page, which in the case of FIG. 2A is the wizard's first page 210. The content and appearance of current page section 230 is governed by the page object corresponding to the currently displayed page (e.g. the appearance of the current page section 230 in FIG. 2A is governed by the "my page 1" object 34 of FIG. 1). It will be appreciated that, to the extent that subsequent pages in the wizard differ in content from the first page 210, the appearance of the current page section 230 will change as the user 18 traverses the pages of the wizard UI 200.

The wizard frame section 232 of wizard UI 200 essentially comprises all of the remaining areas of the wizard UI 200 aside from the current page section 230. The wizard framework section 232 thus consists primarily of the title bar at the top of the wizard 200 and the navigational controls at the bottom of the wizard 200. The title bar of the wizard framework section 232 is used in the present embodiment to convey the identity of the current page to the user 18, while the navigational controls permit the user 18 to traverse the wizard page-by-page. It will be appreciated that the appearance of wizard frame section 232 is essentially consistent from page to page (i.e. across FIGS. 2A to 2C), with the exception that the text in the title bar and the active/inactive status of the navigational control buttons may vary. The wizard framework section 232 is governed by the "my wizard framework" object 32 (FIG. 1).

The navigational controls of the wizard framework section 232 comprise a "cancel" button 202, a "back" button 204, a "next" button 206, and a "finish" button 208. In FIG. 2A, the "cancel" and "next" buttons 202 and 206 are active while the "back" and "finish" buttons 204 and 208 are inactive. The active/inactive status of the buttons is indicated by solid and dotted lines, respectively, and is determined largely by the ordinal position of the displayed page in the overall wizard page sequence, as will be familiar to those skilled in the art.

First page 210 contains various user-editable Fields for assisting a user 18 with the formatting of a letter document. These Fields include a "Style" radio button Field 212 for selecting a letter style, an "Include" Field 214 comprising checkboxes 216, 218 and 220 for indicating desired lines to be included in the letter, and corresponding text entry Fields 222, 224 and 226 for entering text for the selected lines. Some fields (e.g. 218 and 224) have been edited by the user 18.

FIGS. 2B and 2C illustrate the wizard UI 200 with its second and third pages (respectively) being displayed in current page section 230. Second page 240 pertains to sender information and thus includes text entry Fields 242 and 244 for entry of a sender's name and address (respectively). These Fields have been edited by the user 18. Third wizard page 270 pertains to recipient information and includes recipient name and address text entry Fields 272 and 274 analogous to Fields 242 and 244.

Figure 3:
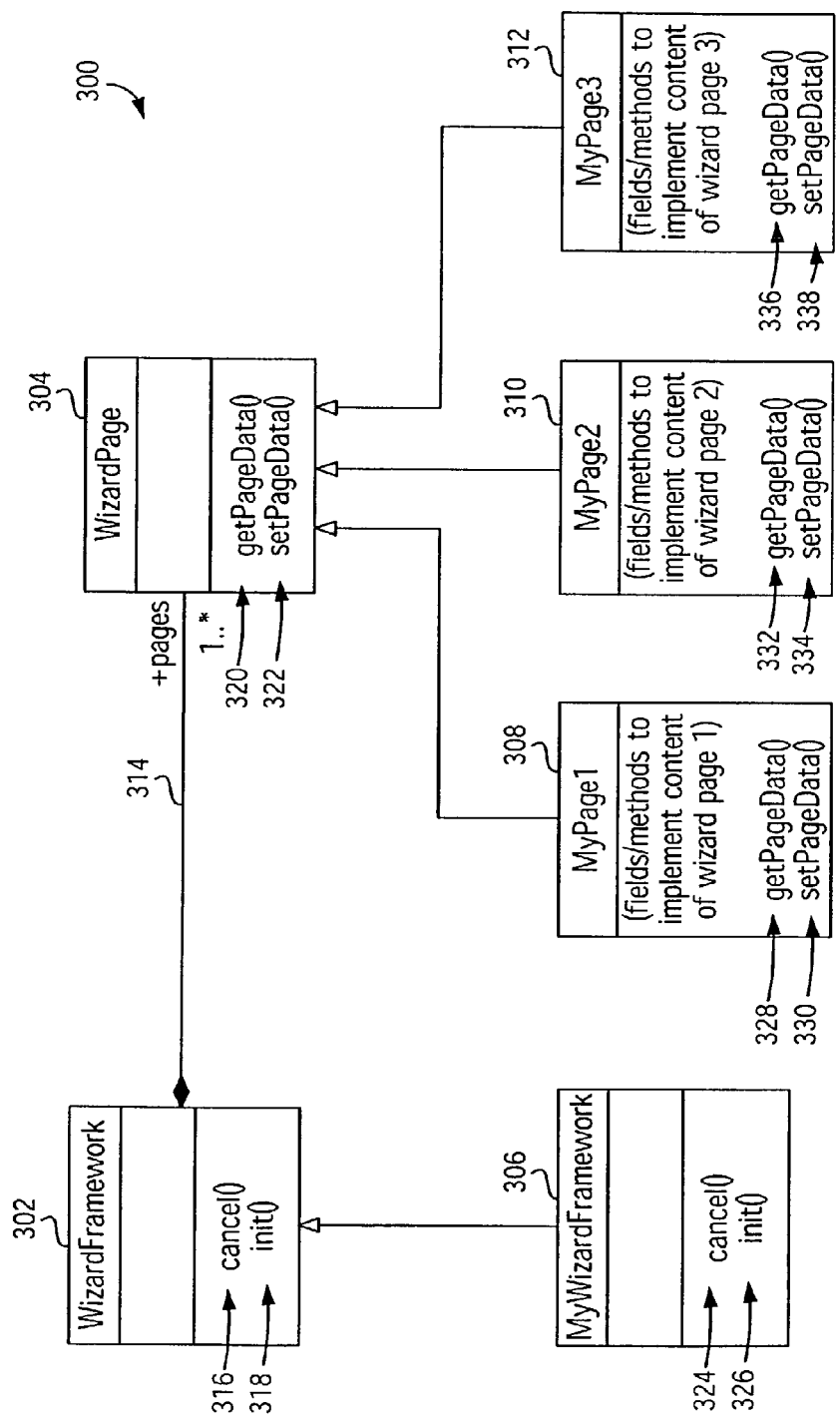
FIG. 3 is a Unified Modeling Language (UML) schema illustrating various classes used to implement the application software of FIG. 1.

Referring now to FIG. 3, a Unified Modeling Language (UML) schema 300 illustrating various wizard-related classes comprising the application software 40 is illustrated. The UML schema 300 follows the standard nomenclature for UML as set out in, for example, Grady Booch, Ivar Jacobsen, James Rumbaugh, "The Unified Modeling Language User Guide", Addison-Wesley, 1999, the contents of which are incorporated herein by reference.

The schema 300 contains two groups of classes: baseline classes and derived classes. Baseline classes include the WizardFramework class 302 and the WizardPage class 304. These classes originate from, and are part of, the standard object oriented UI class library that is utilised by the application software 40. As known by those skilled in the art, classes 302 and 304 are defined according to the known wizard framework-page paradigm that is characteristic of standard object oriented UI class libraries. The baseline classes are not instantiated per se in the application software 40, but rather are used as base classes from which specialised wizard framework and wizard page classes, which comprise the "derived classes" in schema 300, are derived. Baseline classes are identifiable by the lack of the prefix "my" in their class name.

The remaining four classes in schema 300, i.e. MyWizardFramework class 306, MyPage1 class 308, MyPage2 class 310, and MyPage3 class 312, comprise the schema's derived classes. These classes are not part of the standard UI class library, but rather are descendant from either the baseline WizardFramework class 302 or the baseline WizardPage class 304. The derived classes inherit code from their parent classes for implementing certain baseline wizard functionality, such as the displaying of navigational control buttons and the handling of button events for example. Moreover, the derived classes contain additional code to implement the wizard UI's cancel/resume capability, as will be described. Derived classes are identifiable in schema 300 by the prefix "my" in their class name, which connotes adaptation of the class from its baseline version.

It will be appreciated that various other classes not appearing in FIG. 3 may comprise the schema 300.

Referring first to the baseline classes, WizardFramework class 302 defines the baseline functionality of the wizard UI mechanism. The WizardFramework class 302 includes fields and methods (not illustrated) that are used to implement such baseline wizard capabilities as the displaying of the wizard's navigational control buttons, the handling of button events, and the management of the wizard's multiple pages for example. The WizardFramework class 302 defines a cancel( ) method 316 that is executed whenever the wizard's "cancel" button is selected. The WizardFramework class 302 further defines an init( ) method 318, which may be a class constructor, that is executed upon the invocation of the wizard UI 200. As will be described, both of these methods are overridden in the MyWizardFramework class 306 that is derived from the class 302 for the purpose of supporting the desired cancel/resume capability of the wizard UI 200. It will be appreciated that no cancel/resume capability is provided by the baseline WizardFramework class 302.

WizardPage class 304 defines the baseline functionality of a wizard page. Like the WizardFramework class 302, the WizardPage class 304 forms part of the utilised standard UI class library. The class 304 includes fields and methods (not illustrated) that are used to implement such capabilities as the displaying or hiding of a wizard page for example. The WizardPage class 304 defines a getPageData( ) method 320 and a setPageData( ) method 322 which provide a mechanism by which wizard page data may be input to a page object or returned from the wizard page object. As will be described, these methods (which may have different names in the wizard page classes of other standard UI class libraries) are overridden in the MyPage1 class 308, MyPage2 class 310 and MyPage3 class 312 derived from WizardPage class 304 for the purpose of supporting the wizard's cancel/resume capability. It will be appreciated that no cancel/resume capability is provided by the baseline WizardPage class 304.

As may be seen in FIG. 3, the WizardPage class 304 and WizardFramework class 302 are associated by way of a composition relationship 314. As understood by those skilled in the art, composition relationship 314 indicates that an instantiation of the WizardFramework class 302 may contain one or more instantiations of the WizardPage class 304. This composition relationship permits a wizard framework object to dynamically access a contained wizard page object's visible methods at run time for such purposes as triggering page operations (e.g. the display of a page) in response to certain events detected at the framework level (e.g. a navigation control button event). It will be appreciated that composition relationship 314 is inherited by the descendants of the WizardFramework class 302 and the WizardPage class 304.

Turning now to the derived classes in schema 300, MyWizardFramework class 306 defines the content and functionality of the wizard framework section 232 of the wizard UI 200. When instantiated at run time, class 306 comprises the "my wizard framework" object 32 (FIG. 1). The MyWizardFramework class 306 includes fields and methods inherited from the parent WizardFramework class 302 which define the baseline functionality of the wizard UI mechanism. The MyWizardFramework class 306 further includes added code which supports the cancel/resume capability of the UI 200. This added code comprises an adapted cancel( ) method 324 and adapted init( ) method 326 which override the default functionality of the methods of the same name (i.e. methods 316 and 318) defined in the parent WizardFramework class 302.

The cancel( ) method 324 of the MyWizardFramework class 306, which is executed in lieu of cancel( ) method 316 when the "cancel" navigational control button 202 of wizard UI 200 is selected, contains code which causes a "cancel options" prompt to be displayed. This prompt 400 presents the user 18 with several cancellation options, including the option of saving the state of the wizard UI 200 for possible later resumption. The cancel( ) method 324 further contains code which causes wizard state data to be written to the wizard state file 28 during the course of wizard cancellation, as will be described below.

The init( ) method 326 of the MyWizardFramework class 306, which is executed in lieu of init( ) method 318 upon invocation of the wizard UI 200 immediately after the triggering event, contains code which causes a "resume options" prompt to be displayed. This prompt 500 presents the user 18 with the option of restoring a previously cancelled wizard UI, as will also be described. The init( ) method 326 further contains code which causes wizard state data to be read from the wizard state file 28 during the course of wizard restoration, as will also be described.

The MyPage1 class 308 defines the content and functionality of the wizard UI's first page 210 (FIG. 2A). When instantiated, the MyPage1 class 308 comprises the "my page 1" object 34 of FIG. 1. The MyPage1 class 308 includes fields and methods inherited from the WizardPage class 304 which define the baseline functionality of a wizard page. The MyPage1 class 308 further includes additional fields and methods which define the content and appearance of the first wizard page 210, as well as code to support the cancel/resume capability of the UI 200. The cancel/resume support code comprises an adapted getPageData( ) method 328 and an adapted setPageData( ) method 330, which override the default functionality of the methods of the same name defined in the parent WizardPage class 304 (i.e. methods 320 and 322 respectively).

The getPageData( ) method 328 causes the current state of the wizard's first page 210 to be captured and returned to the caller of the method in the form of a single encoded value. In particular, the getPageData( ) method 328 encodes the current value of various fields in the MyPage1 class 308 that are used to implement the GUI comprising the first page 210 into a single variable and then returns that variable to the caller. The fields of class 308 that are so encoded comprise fields that are used to maintain the state of the wizard's first page 210, such as the fields used to implement the "Style" radio button Field 212 and the "Include" Field 214 of FIG. 2A for example. It will be appreciated that any data entered by a user 18 into the Fields of first page 210 (e.g. checkbox Field 218 or text entry Field 224) will be captured during this encoding process.

The adapted setPageData( ) method 330 of MyPage1 class 308 causes the state of the wizard's first page 210 to be set based on a received input parameter. The setPageData( )

method 330 is essentially the complement of the getPageData( ) method 328, as it restores the state of first page 210 based on a value that was generated by the getPageData( ) method 328 during the capture of a previous wizard state. The setPageData( ) method 330 decodes the received parameter to extract previously saved field values and repopulates these extracted values into the appropriate class fields so that the wizard page 210 is restored to its previously captured state. The fields that are repopulated in this manner are the same fields that are captured by way of the getPageData( ) method 328 described above.

The variable returned by the getPageData( ) method 328 and the parameter received by the setPageData( ) method 330 are both of type string. The motivation for utilising a single, variably-sized "generic" type variable (such as a string or a Java™ collection class for example) to output captured field values and input these values is maintainability and flexibility. Maintainability is promoted because any changes to the GUI of first page 210 will not necessitate an update of the interface to the getPageData( ) method 328 or setPageData( ) method 330 (because the return variable and input parameter will still be of type string even if their size or encoded content is changed). Only the getPageData( ) and setPageData( ) methods 328 and 330 will require modification, to ensure that new or changed fields are encoded in the returned value of method 328 and decoded from the input parameter to method 330, respectively.

Flexibility is promoted for similar reasons. In particular, introduction of the cancel/resume capability into various wizard applications may be effected by incorporating the MyWizardFramework class 306 into the corresponding application software 40 with little or no modification. This is possible because the MyWizardFramework class 306 treats state data that is received from (and passed to) the various page classes as a "black box" generic value of variable length and indeterminate semantic meaning. Given this design, the developer of a new wizard may focus on implementing the content of each wizard page (by implementing the business logic of the associated "my page" class, together with the corresponding adaptation of the getPageData( ) and setPageData( ) methods to capture and restore the state of the associated wizard page), and need not worry about updating the cancel( ) or init( ) methods of the MyWizardFramework class 306.

In alternative embodiments, it is of course possible to implement the getPageData( ) and setPageData( ) interfaces using multiple parameters of various, non-generic types so that the resultant wizard UI will have the same cancel/resume capability. However, in this case the above noted advantages of software maintainability and flexibility would be diminished or lost.

The MyPage2 class 310 and MyPage3 class 312 are analogous to the MyPage1 class 308. The MyPage2 class 310 defines the content and functionality of the wizard's second page 240 (FIG. 2B) and, when instantiated, comprises the "my page 2" object 36 (FIG. 1). Likewise, the MyPage3 class 312 defines the content and functionality of the wizard's third page 270 (FIG. 2C) and serves as the class from which the "my page 3" object 38 is instantiated. It will be appreciated that the getPageData( ) methods 332, 336 and setPageData ( ) methods 334, 338 of these classes are adapted to encode/decode the appropriate fields of their respective classes to capture the necessary "state data" for the associated page.

Figure 4:
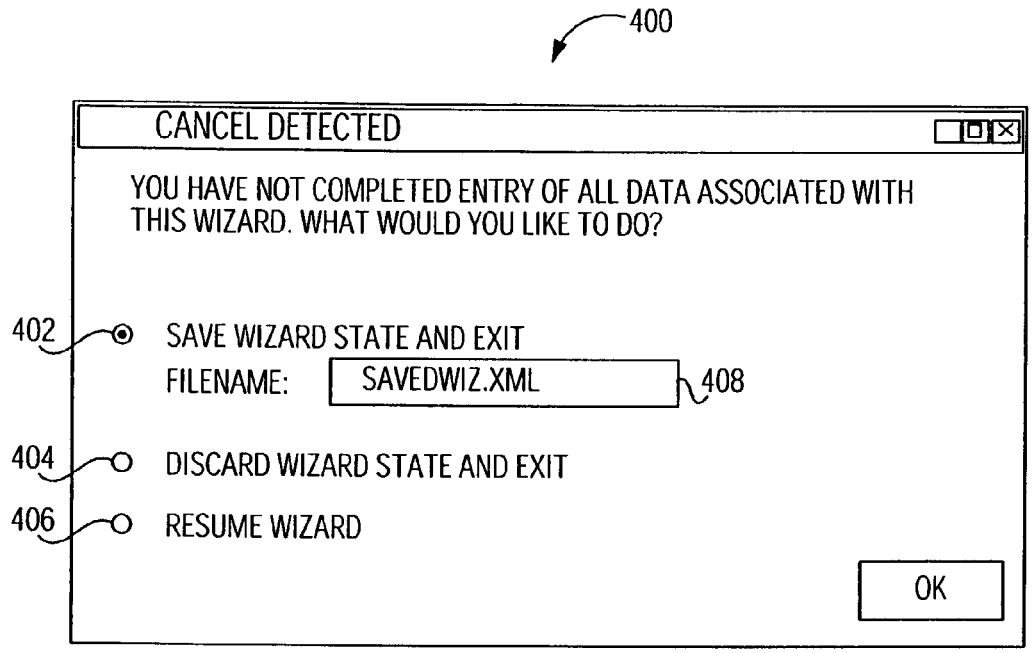
FIG. 4 illustrates a prompt that is displayed by the computing system of FIG. 1 when the "cancel" button of the wizard UI illustrated in FIGS. 2A, 2B and 2C is selected.

FIG. 4 illustrates an exemplary "cancel options" prompt 400 that is displayed by the computing system 10 of FIG. 1 when the "cancel" button 202 of wizard UI 200 (FIG. 2A, 2B or 2C) is selected. The prompt 400, which is in the form of a dialog box, allows the user 18 to choose between three actions: (1) cancel the wizard and save its state; (2) confirm the cancellation of the wizard and discard all entered data; or (3) resume the wizard. These options are represented in the form of three radio buttons 402, 404 and 406. A filename text entry Field 408 associated with the radio button 402 provides a mechanism for entering a desired filename for the wizard state file 28 in the event that the first option is selected.

Figure 5:
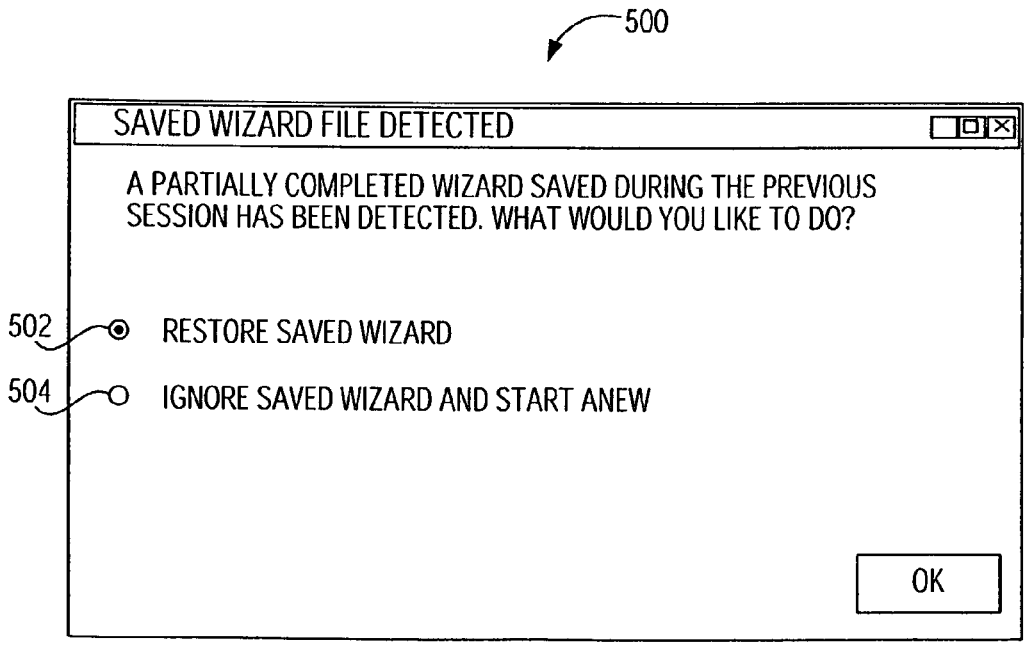
FIG. 5 illustrates a prompt that is displayed by the computing system of FIG. 1 upon the subsequent re-invocation of the wizard UI of FIGS. 2A, 2B and 2C.

FIG. 5 illustrates an exemplary "resume options" prompt 500 that is displayed by the computing system 10 when the wizard UI 200 is invoked after having been previously cancelled. The prompt 500, which similarly takes the form of a dialog box, allows the user 18 to choose between two actions: (1) restore the saved wizard; or (2) ignore the saved wizard and start the wizard UI 200 anew. These two options are represented in the form of two radio buttons 502 and 504.

Figure 6:
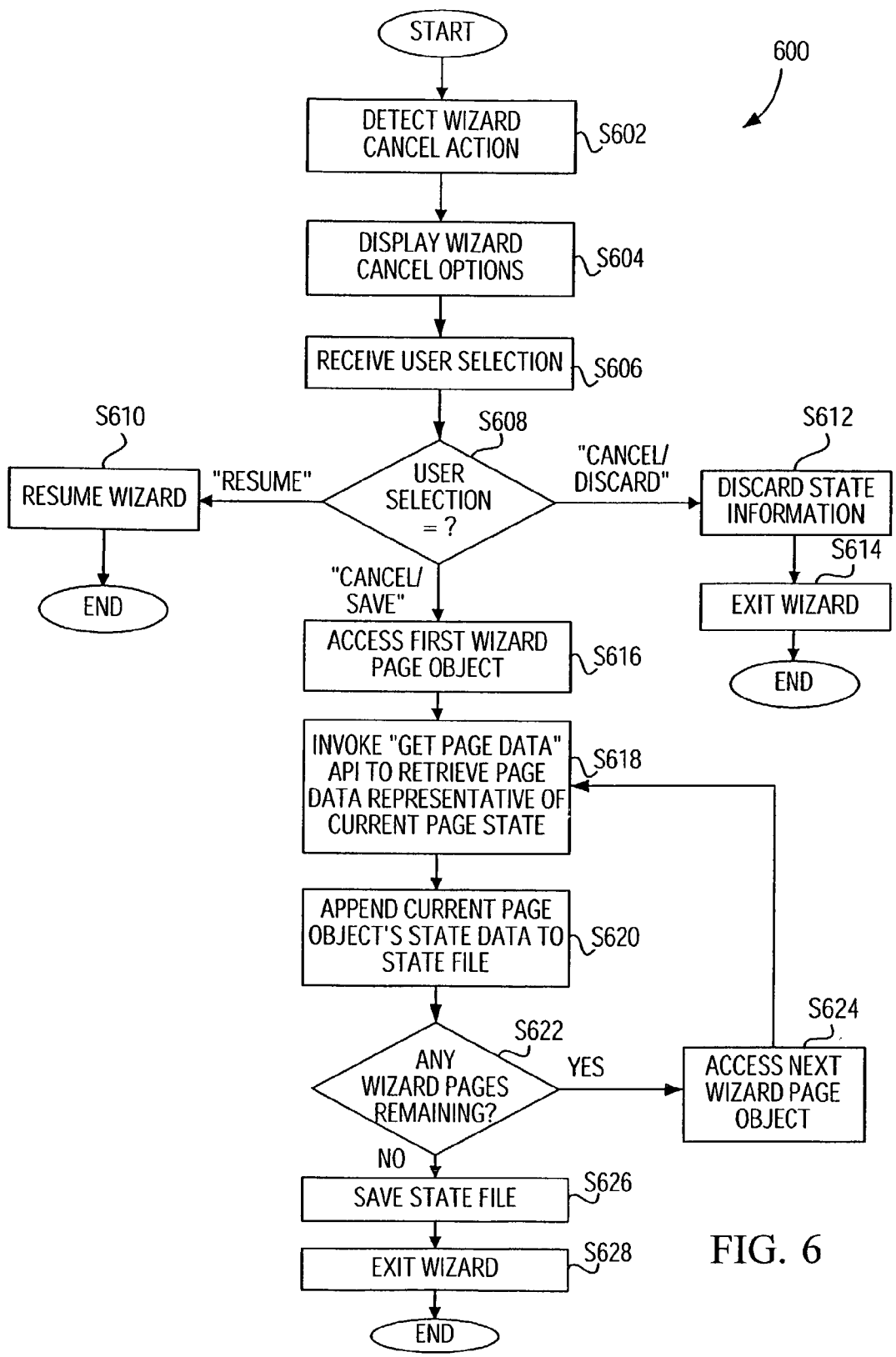
FIG. 6 illustrates a flowchart of steps executed by the computing system of FIG. 1 when the wizard's "cancel" button is selected.
Figure 7:
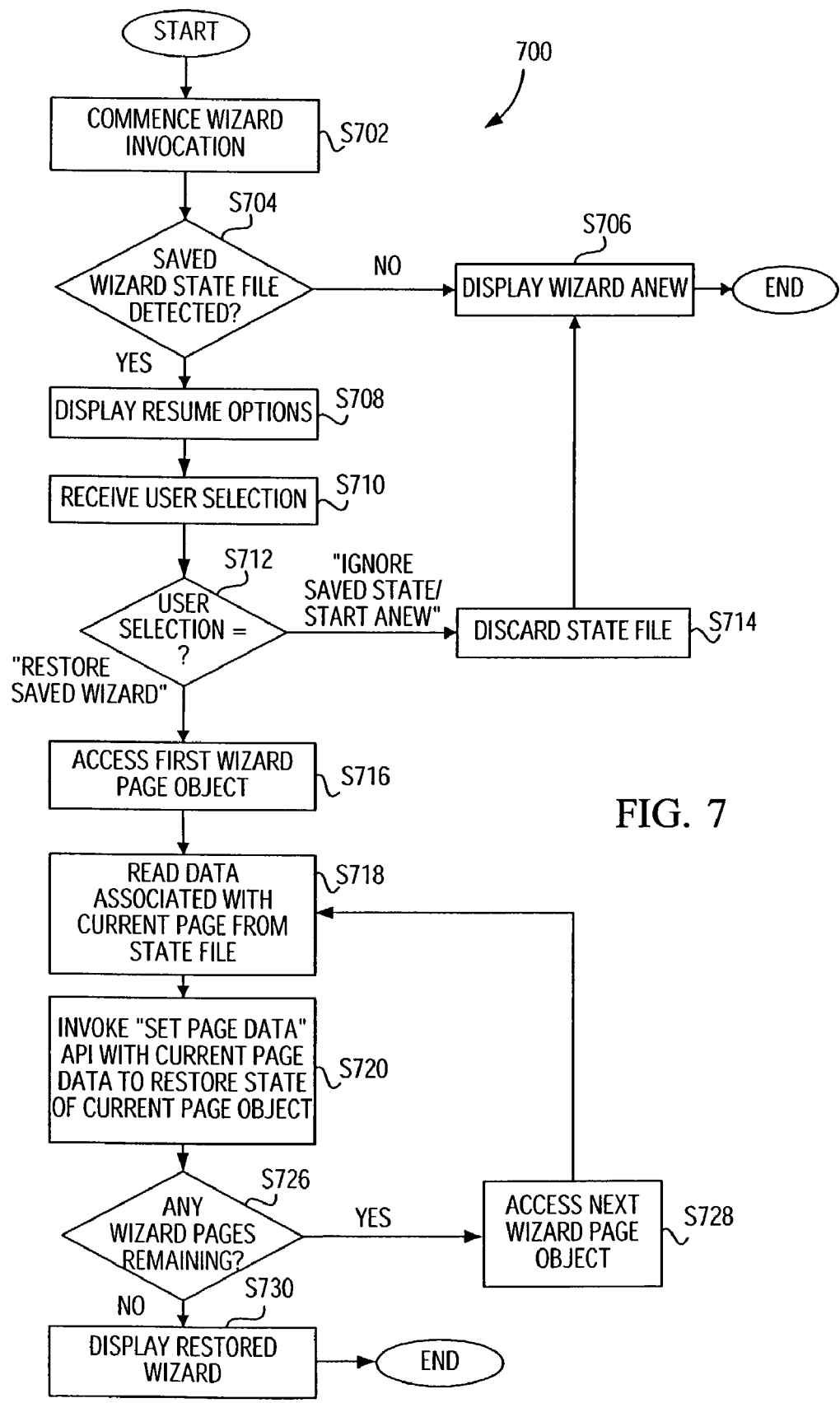
FIG. 7 illustrates a flowchart of steps executed by the computing system of FIG. 1 upon the subsequent re-invocation of the wizard UI.

The operation of the present embodiment is illustrated in the flowchart of steps 600 and 700 of FIGS. 6 and 7, with additional reference to FIGS. 1, 2A-2C, 3, 4 and 5. Steps 600 illustrate the operation of the computing system 10 upon the selection of the "cancel" button 202 of the wizard UI 200, while steps 700 illustrate the operation of the computing system 10 upon the subsequent invocation the wizard UI 200.

With respect to steps 600, it is initially assumed that the triggering event associated with the wizard has occurred, and that the wizard UI 200 illustrated in FIGS. 2A, 2B and 2C has accordingly been displayed on the display 16 of the computing system 10 (FIG. 1) to a user 18. This display of wizard UI 200 of course results in the instantiation of the "my wizard framework" object 32 as well as "my page 1" object 34, "my page 2" object 36, and "my page 3" object 38, in volatile memory 14 (FIG. 1). The user 18 has utilized UIM 20 to enter data in Fields 212, 214, 242 and 244 on the first two pages 210 and 240 of the wizard UI 200, as illustrated in FIGS. 2A and 2B.

The user 18, wishing to cancel from the wizard UI 200 prior to its completion, selects the "cancel" navigational control button 202, which action is detected in step S602. More specifically, the action is detected within the "my wizard framework" object 32 (FIG. 1), which is responsible for handling navigational control button events. As a result, the cancel( ) method 324 (FIG. 3) of the object 32 is invoked. This method 324 triggers the display of the "cancel options" prompt 400 of FIG. 4 to the user 18 in step S604.

The user 18, wishing to save wizard UI 200 for possible continued editing at a later time, selects the first radio button 402 using UIM 20. This selection is received by the cancel( ) method 324 in step S606 and is identified as a "cancel but save state" selection in step S608. The user 18 enters the desired filename for the wizard state file 28 ("savedwiz.xml") in the "filename" text entry Field 408 (FIG. 4), which has become active upon the user's selection of the first radio button 402. Once the filename has been specified by the user 18, a wizard state file 28 of the specified name is opened in non volatile memory 26 (FIG. 1).

Thereafter, in step S616 the "my wizard framework" object 32 accesses the "my page 1" object 34 (by way of the instantiated composition relationship 314 of FIG. 3). At this stage, processing enters a loop whereby, for each of the wizard's three pages, the "my wizard framework" object 32 interacts with the corresponding page object to trigger the capture and return of state data for the corresponding wizard page, and the returned page-specific state data is saved to the wizard state file 28.

In a first pass through the loop, the "my wizard framework" object 32 invokes the getPageData( ) method 328 of the "my page 1 " object 34 in step S618 to retrieve page specific state data for first page 210. Upon being invoked, the getPageData( ) method 328 encodes, according to a chosen encoding algorithm (which may comprise simple concatenation for example), the current values of the various fields of the MyPage1 class 308 used to maintain the state of first page 210 into a string variable and returns the string to the "my wizard framework" object 32. The returned string is appended to the wizard state file 28 in step S620 along with XML tags (e.g. "<wizpage1>" and "</wizpage1>") suitable for identifying the instant data as being associated with the first wizard page 210. These tags will later be used to identify and retrieve the data during wizard restoration.

In step S622, it is determined that wizard pages remain which have not yet had their state captured. Accordingly, the next wizard page object, i.e. the "my page 2" object 36, is accessed in step S624.

In a second pass through the loop, the "my wizard framework" object 32 invokes the getPageData( ) method 332 of the "my page 2" object 34 in step S618 to retrieve page specific state data for second page 240. Upon being invoked, the getPageData( ) method 332 encodes the current values of the various fields of the MyPage2 class 310 that are used to maintain the state of second page 240 (which fields will differ from those captured in the "my page 1" class 34) into a string variable using the same encoding algorithm as was used for the first page 210. The returned string is appended to the wizard state file 28 in step S620 along with XML tags suitable for identifying the returned state data as being associated with the second wizard page 240 (e.g. "<wizpage2>" and "</wizpage2>").

In step S622, it is again determined that wizard pages remain which have not yet had their state captured. Accordingly, the next wizard page object, i.e. the "my page 3" object 38, is accessed in step S624.

In the third and final pass through the loop, the "my wizard framework" object 32 invokes the getPageData( ) method 336 of the "my page 3" object 38 in step S618 to retrieve the page-specific state data for third page 270. Thereafter, the state of page 270 is encoded into a string variable, returned to the "my wizard framework" object 32 in the form of an encoded string, and stored in the wizard state file 28 (step S620) by way of the same procedure as was used for capturing the state of the wizard's first two pages.

In step S622, it is determined that the state of all the wizard's pages has been captured in wizard state file 28. Accordingly, in step S626 the wizard state file 28 is saved to non-volatile memory 26, and the wizard UI 200 is exited in step S628.

Although not a feature of the present embodiment, in alternative embodiments an additional step may be introduced after step S622 whereby the identity of the currently-displayed page or other framework level wizard information is appended to the wizard state file 28 prior to it being saved in step S626. This may be done if it is desired to later restore the wizard UI 200 with the most recently displayed page as the default start page for example. Framework level wizard information of this type may typically be obtained from various fields of the MyWizardFramework class 306.

In the event that the user 18 had selected the second of the "cancel options" of the prompt 400 of FIG. 4 (i.e. radio button 404), the selection of this "discard state and exit" option will be identified in step S608. Subsequently, in steps S612 and S614 any data that was entered on any of the wizard's pages will be discarded and the wizard UI 200 will be exited.

Alternatively, if the user 18 had selected the third of the "cancel options" of prompt 400 (i.e. radio button 406), this selection of this "resume wizard" option would be identified in step S608, and the cancellation process will be aborted. In this case, control is returned the wizard UI 200 in step S610 and the user 18 may resume interacting with the wizard UI 200. Data entered on any of the wizard's pages prior to the selection of the "cancel" button 202 will be maintained.

When the user 18 later causes the wizard's triggering event to occur, the wizard UI 200 will be invoked according to the steps of FIG. 7. In step S702, wizard invocation commences with the associated instantiation of the "my wizard framework" object 32 and page objects 32, 34 and 36. Instantiation of the object 32 in turn causes the init( ) method 326 of the MyWizardFramework class 306 to be invoked.

The init( ) method 326 checks for the existence of a wizard state file 28 in non volatile memory 26 in step S704. This step may involve examination of a default directory in non volatile memory 26 for the existence of a file with a predetermined extension for example. If no wizard state file 28 is found, this indicates that the wizard UI 200 was either not previously cancelled or was cancelled without its state being saved. In that case the wizard UI 200 would be displayed anew in step S706 with no data being present in any of the wizard's Fields.

In the present case however, a wizard state file 28 with the filename "savedwiz.xml" is found to exist in non volatile memory 26 in step S704. Accordingly, the "resume options" prompt 500 of FIG. 5 is displayed to the user 18 on the display 16 in step S708.

The user 18, wishing to continue editing of the previously cancelled wizard UI 200, selects the first radio button 502 of the prompt 500 using UIM 20. This selection is received in step S710 and identified as a "restore saved wizard" choice in step S712. In step S716, the "my wizard framework" object 32 accesses the first wizard page object, namely "my page 1" object 34, by way of the instantiated composition relationship 314 (FIG. 3).

At this stage, processing enters a loop whereby, for each of the wizard's three pages, the "my wizard framework" object 32 reads state data that is specific to the current page from the wizard state file 28 and then passes this data to the corresponding page object for repopulation into the object's fields for the purpose of restoring the wizard page to its pre-suspension state.

In a first pass through the loop, the "my wizard framework" object 32 parses the wizard state file 28 for XML tags which identify the associated encoded data as pertaining to the first wizard page 210 (e.g. "<wizpage1>" and "</wizpage1>"), and then reads this associated data from the wizard state file 28 in step S718. Subsequently, the "my wizard framework" object 32 invokes the setPageData( ) method 330 of the "my page 1" object 34, passing the identified encoded data thereinto as an input parameter, to trigger restoration of first page 210 in step S720. Upon being invoked, the setPageData( ) method 330 decodes the input string (using the inverse of the encoding algorithm used in the getPageData( ) method 328) and thereby extracts previously saved values of MyPage1 class 308 fields. These extracted values are then repopulated into the appropriate class 308 fields so that the wizard page 210 is restored to its previous state. It will be appreciated that the fields that are repopulated in this manner are the same fields that were previously encoded by way of the getPageData( ) method 328. It will further be appreciated that data previously entered into any of the Fields of first page 210 (e.g. checkbox Field 218 or text entry Field 224) will be restored during this process.

In step S726, it is determined that wizard pages remain which have not yet had their state restored. Accordingly, the next wizard page object, i.e. the "my page 2" object 36 is accessed in step S728.

In a second pass through the loop, the "my wizard framework" object 32 identifies the encoded state data associated with the second wizard page 240 from wizard state file 28 by parsing the file 28 for the appropriate XML tags (e.g. "<wizpage2>" and "</wizpage2>") and then reads the associated data therefrom in step S718. Subsequently, in step S720 the "my wizard framework" object 32 invokes the setPageData( ) method 334 of the "my page 2" object 34, passing the retrieved page data thereinto as an input parameter, to trigger restoration of second page 240. Upon being invoked, the setPageData( ) method 334 repopulates the fields of its associated MyPage2 class 310 using an analogous procedure as was used to repopulate the fields of the MyPage1 class 308 described above.

In step S726, it is determined that wizard pages remain which have not yet had their state restored. Accordingly the next wizard page object, i.e. the "my page 3" object 38 is accessed in step S728.

In a third and final pass through the loop, the state of the third wizard page 270 is restored in steps S718 and S720 by way of the same procedure as was used to restore the first two wizard pages 210 and 240. Subsequently, in step S726 it is determined that all wizard pages have in fact had their state restored. Accordingly, in step S730 the restored wizard UI 200 is displayed to the user 18 on the display 16 of system 10, at which time the user 18 may interact with the wizard UI 200 as desired. Advantageously, user-entered data from the previous wizard editing session is restored without any need for reentry of this data by the user 18.

Although not a feature of the present embodiment, in alternative embodiments an additional step may be introduced after step S726 whereby the identity of the most recently displayed page or other framework level wizard information is read from the wizard state file 28 prior to the display of the wizard UI 200 to the user in step S730. This additional step may permit the wizard UI 200 to be restored with the most recently displayed page as the default start page for example. In this case, restoration may involve the repopulation of various fields of the MyWizardFramework class 306 with the previously stored framework level wizard information.

In the event that the user 18 had selected the second of the "resume options" of prompt 500 of FIG. 5 (i.e. radio button 504), this selection of the "ignore saved wizard" option would be identified in step S712. Subsequently, the wizard state file 28 would be discarded (e.g. by deleting it) in step S714 and the wizard UI 200 would be displayed anew, with no data in any of its Fields, in step S706.

As will be appreciated by those skilled in the art, modifications to the above-described embodiment can be made without departing from the essence of the invention. For example, the two baseline wizard classes of the UI class library or the like could be modified to include the described methods which allow resumption of use of a wizard (i.e., the described cancel( ), init( ), getPageData( ), and setPageData( ) methods). In this case, objects representative of any particular wizard may be instantiated directly from these baseline wizard classes rather than from classes derived from these baseline wizard classes.

It is not necessary that the "cancel" navigational button 202 and the associated cancel( ) method to be used to trigger and implement the above-described "cancellation" behaviour. Rather, this behaviour may be triggered by a separate control such as a "suspend" button or the like, and may be implemented by a method separate from the cancel( ) method. Similarly, a separate "resume" control and a method separate from the init ( ) method may be employed to restore a saved wizard UI.

Moreover, the use of a "cancel options" prompt 400 may be omitted in alternative embodiments, with the state of a wizard UI instead being saved automatically (and transparently) upon wizard cancellation. Likewise, the "resume options" prompt 500 may be omitted, with the state of a previously saved wizard UI 200 being restored automatically upon the detection of a corresponding wizard state file 28.

The wizard state file 28 used to store a wizard's state need not be implemented as an XML data instance file. Any format may be used which allows restoration of a previously cancelled wizard UI as described. Also, multiple wizard state files may be used in place of the single wizard state file 28. Moreover, the filename of the wizard state file(s) may be automatically determined by the computing system 10.

Fundamentally, the wizard UI 200 need not be developed using wizard-related classes from a standard UI class library and need not be developed in an object oriented programming language. A non-object oriented programming language implementation of a wizard UI adhering to the above-described behaviour may be developed without the use of any predefined wizard-related components.

Other modifications will be apparent to those skilled in the art and, therefore, the invention is defined in the claims.

The embodiments of the invention in which an exclusive property or privilege is claimed are defined as follows:

1. A method for permitting phased data entry with a wizard user interface, comprising:
    saving a state of the wizard user interface upon wizard cancellation by the user, wherein said saving comprises saving a value representative of state information for at least one page of said wizard user interface.

2. The method of claim 1 wherein said value is a concatenation comprising data entry field values of at least one wizard page.

3. A method for permitting phased data entry with a wizard user interface, comprising:
    saving a state of the wizard user interface upon wizard cancellation by the user, wherein said saving comprises saving an XML data instance file.

4. A method for permitting phased data entry with a wizard user interface, comprising:
    saving a state of the wizard user interface upon wizard cancellation by the user;
    on invocation of said wizard user interface, restoring said wizard interface to said saved state; and
    prompting for restoration of said wizard user interface and receiving instructions to restore said wizard UI prior to restoring said wizard UI to said saved state.

5. A method of developing a wizard user interface capable of phased data entry, comprising:
    adapting a wizard framework class and at least one wizard page class to save a state of the wizard user interface upon wizard cancellation by the user.

6. The method of claim 5 wherein said adapting causes a value representative of state information for at least one page of said wizard user interface to be saved.

7. The method of claim 6 wherein said value is a concatenation comprising data entry field values of at least one wizard page.

8. The method of claim 5, wherein said adapting causes said state to be saved to an XML data instance file.

9. The method of claim 5, further comprising:
adapting a wizard framework class and at least one wizard page class to restore said wizard user interface to said saved state on invocation of said wizard user interface.

10. The method of claim 9, wherein said adapting of a wizard framework class and at least one wizard page class to restore said wizard user interface causes said restored wizard user interface to initially be displayed at its most recently displayed page.

11. The method of claim 5, wherein said adapting establishes an interface between said wizard framework class and said at least one wizard page class through which generically typed wizard page state data is passed.

12. The method of claim 11, wherein said generically typed wizard page state data is of variable size.

13. The method of claim 12, wherein said generically typed wizard page state data has a string data type.

14. The method of claim 12, wherein said generically typed wizard page state data has a collection class data type.

15. A method of developing a wizard user interface capable of phased data entry, comprising the steps of:
adapting a wizard framework class and at least one wizard page class to automatically save a state of the wizard user interface, comprising all data entered by a user in said wizard user interface, upon wizard cancellation by the user; and
adapting a wizard framework class and at least one wizard page class to, on a subsequent invocation of said wizard user interface, restore said wizard user interface to said saved state.

* * * * *